Dec. 2, 1958  V. V. PAGANO  2,862,497
URINARY CATHETER
Filed Feb. 7, 1958
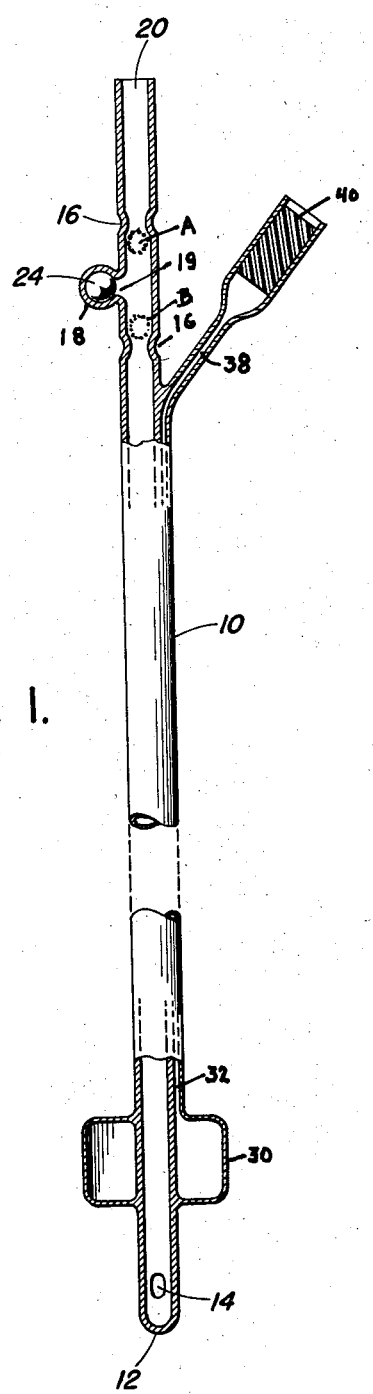
Fig. 1.
Fig. 2.
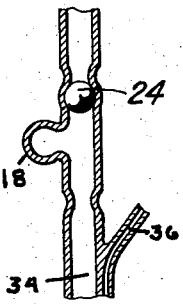
Fig. 3.
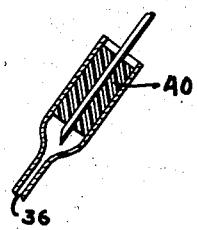
INVENTOR.
Vito V. Pagano
Morgan, Finnegan, Durham & Pine
ATTORNEYS

United States Patent Office 2,862,497
Patented Dec. 2, 1958

2,862,497

URINARY CATHETER

Vito V. Pagano, Jackson Heights, N. Y.

Application February 7, 1958, Serial No. 713,815

4 Claims. (Cl. 128—349)

The present invention relates to a novel and improved catheter, especially a urinary catheter.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a side elevation, partly in section showing a preferred and illustrative embodiment of the present invention;

Figure 2 is a fragmentary sectional view showing a portion of the embodiment shown in Figure 1 but with the valve member in closed position; and Figure 3 is a sectional view taken on the line 3—3 of Figure 1.

The present invention has for its object the provision of a novel and improved catheter which is provided with a simple, easily manipulated and reliable valve adapted to control the flow of urine or other fluid through and from the catheter. A further object is the provision of a urinary catheter which may be allowed to remain in the urethra for extended periods and which is valved to be conveniently opened or closed as desired, thereby avoiding repetition of the painful process of inserting and removal of the catheter through the urethra.

In general, the catheter of the present invention comprises a long, slender, smooth cylindrical tube, of an appropriate size such as from 3 to 5 mm. in outside diameter, formed of vulcanized gum rubber, vulcanized latex rubber, plasticized vinylite, polyethylene or other soft, non-deteriorating, non-irritating plastic material. At one end thereof, the tube is formed with a rounded tip and a lateral eye or aperture through which liquid may enter from the bladder. At the outer end, the catheter is provided with a valve structure which can be rapidly and easily manipulated by the fingers of one hand to either the open or closed position, providing an effective closure for the discharge end, and also allowing, when open, a direct discharge of urine or other fluid so that all possible inconvenience is avoided and a controllable, directional stream is attained which may be completely collected in, or directed into any suitable receptacle.

It will be understood that the foregoing general description and the following detailed description as well are exemplary and explanatory of the invention but are not restrictive thereof.

Referring now in detail to the present preferred and illustrative embodiment which is shown in detail in the accompanying drawings, there is provided an elongated, slender, cylindrically smooth, tubular member 10 of appropriate outside diameter, such as about 3 to 5 millimeters, having thin walls and formed of vulcanized gum or latex rubber, plasticized vinylite, polyethylene or other non-irritating, insoluble and non-deleterious plastic material.

At the insertion end, the catheter is formed with a smooth rounded and closed tip 12 which is provided with a lateral aperture 14 through which urine or other body fluid may enter the tube.

Adjacent its outer end, preferably one to three inches from the outer end, tube 10 is provided with a pair of adjacent annular portions 16 of reduced inner and outer diameter and outwardly thereof, and between which is provided a closed lateral communicating septum 18 having a restricted inlet 19. The longitudinal portion of the tube 10 however provides, beyond the portion 16, a direct flow passage 20, the tube 10, septum 18 and passage 20 all being formed of the soft, flexible rubber or other plastic, resilient material.

The valve means, cooperating with the outer portion of the catheter also comprises a ball 24, of glass, stainless steel, nylon or other relatively rigid, durable or non-corrosive material, and which is of a diameter slightly larger than the inside diameter of tube 10 and also somewhat larger than the inside diameter of the annular portions 16 so that it will normally remain between portions 16. Ball 24 may also be accommodated within the closed lateral septum 18 beyond the resilient annulus 19. As shown in Figure 1, the ball 24 is shown within septum 18, and in dotted line position (closed) between the annular portions 16.

In many instances, it is desired to be able to retain the catheter within the urethra for relatively long periods, and the preferred embodiment of the invention provides for means for retaining the catheter in a fixed position even against the maximum voluntary pressure exerted by the patient.

As shown in Figure 1, the internal portion of the catheter is provided with a thin-walled inflatable balloon 30 fixed to the central body 10 of the catheter and adjacent the internal end of the catheter so that the balloon may be inserted into and inflated within the bladder to immobilize the catheter. The balloon 30 is formed as a hollow toroid the inner wall of which is firmly adhered to the tube 10 adjacent to the internal end thereof and is connected to a fine tube 32 which is smoothly bonded to the tube 10 so that there are two non-communicating passages 34 and 36 throughout a major portion of the length of the tube 10, passage 34 serving to drain the bladder and passage 36 serving to inflate or deflate the balloon 30.

Near the outer end, passage 36 is formed as a member 38 separate from tube 10, and with its terminal portion is provided with an elongated plug 40 of soft rubbery material which is normally nonporous to gas pressures of a few pounds per square inch. Most preferably the plug 40 is formed of very soft or unvulcanized rubber, of a sufficient outside diameter to be held within the tube 36 and yet easily punctured by a hypodermic needle through which air may be inserted to inflate the balloon 30 while the plug 40 is self-sealing as soon as the needle is removed.

Thus, the catheter may be inserted into the bladder with the balloon 30 in its deflated condition and then inflated to prevent ejection of the catheter.

In use, the length of the sterilized catheter is lubricated and inserted through the urethra until the eye 14 is well within the bladder. In this position, the catheter may drain the bladder, depending on whether or not the external valve is opened or closed.

The external valve ball 24 will normally be in its closed position, as shown in dotted lines, effectively resisting any normal voluntary pressure of micturation, due to the resiliency of the annular portion 16, and thereby allowing the catheter to remain within the patient over extended periods.

When it is desired to drain the bladder, the tube 10 is grasped between the fingers just above the ball 24, and light pressure on the walls of the tube 10 will force the ball into the septum 18, thereby providing a free flowing unobstructed passageway 20 for the flow of urine from the bladder to a suitable receptacle.

It is preferred to provide for the lateral storage of the ball 24 in septum 18, rather than having the through-passage for the urine to be the lateral passage. By utilizing a direct passage, a more uniform and less turbulent flow, which is more sanitary, is obtained.

The invention in its broader aspects is not limited to the specific mechanisms shown and described but departures may be made therefrom within the scope of the accompanying claims without departing from the principles of the invention and without sacrificing its chief advantages.

What is claimed is:

1. A relatively long, slender, hollow, tubular catheter having an apertured end, the other end of the tubular catheter being formed with an adjacent annular portion of reduced internal diameter and leading to a lateral communicating septum and the other being a discharge passage, a ball valve member larger than the internal diameter of said annular portion and within the tubular portion of the catheter, said ball being adapted to be manipulated through the walls of the catheter from a closed position to the lateral septum and into an open position to a position within the septum.

2. A catheter as claimed in claim 1 in which the discharge passage is a direct extension of the catheter tube and the septum lies laterally to one side of the passage.

3. A catheter as claimed in claim 1 in which the catheter is provided with an inflatable balloon to be located within the bladder and communicates with a tube having an external end.

4. A catheter according to claim 3 in which the external end of said tube is provided with a puncturable plug through which the balloon may be inflated or deflated.

References Cited in the file of this patent

UNITED STATES PATENTS

| | | |
|---|---|---|
| 2,769,442 | Stubbs | Nov. 6, 1956 |
| 2,784,716 | Broman | Mar. 12, 1957 |

FOREIGN PATENTS

| | | |
|---|---|---|
| 325,740 | France | Jan. 30, 1903 |
| 897,567 | France | May 30, 1944 |
| 1,127,112 | France | Aug. 6, 1956 |